(12) United States Patent
Levi et al.

(10) Patent No.: US 12,743,872 B2
(45) Date of Patent: Sep. 22, 2026

(54) MULTI-OBJECTIVE DENSE OPEN-VOCABULARY IMAGE RECORDING

(71) Applicant: GM GLOBAL TECHNOLOGY OPERATIONS LLC, Detroit, MI (US)

(72) Inventors: Hila Levi, Rechovot (IL); Guy Heller, Tel Aviv (IL); Dan Levi, Ganei Tikvah (IL)

(73) Assignee: GM Global Technology Operations LLC, Detroit, MI (US)

( * ) Notice: Subject to any disclaimer, the term of this patent is extended or adjusted under 35 U.S.C. 154(b) by 324 days.

(21) Appl. No.: 18/641,498

(22) Filed: Apr. 22, 2024

(65) Prior Publication Data

US 2025/0329142 A1 Oct. 23, 2025

(51) Int. Cl.

| | |
|---|---|
| ***G06V 10/774*** | (2022.01) |
| ***G06F 40/30*** | (2020.01) |
| ***G06V 10/40*** | (2022.01) |
| ***G06V 10/762*** | (2022.01) |
| ***G06V 10/764*** | (2022.01) |
| ***G06V 10/77*** | (2022.01) |
| ***G06V 20/58*** | (2022.01) |
| ***G06V 20/70*** | (2022.01) |

(52) U.S. Cl.

CPC ............ *G06V 10/774* (2022.01); *G06F 40/30* (2020.01); *G06V 10/40* (2022.01); *G06V 10/762* (2022.01); *G06V 10/764* (2022.01); *G06V 10/7715* (2022.01); *G06V 20/58* (2022.01); *G06V 20/70* (2022.01)

(58) Field of Classification Search

None

See application file for complete search history.

(56) References Cited

U.S. PATENT DOCUMENTS

| | | | | |
|---|---|---|---|---|
| 12,536,689 B2 * | 1/2026 | Schulter | .................... | G06T 7/70 |
| 2024/0161520 A1 * | 5/2024 | Li | .......................... | G06N 3/044 |

(Continued)

OTHER PUBLICATIONS

Wysoczańska et al., "CLIP-DIY: Clip Dense Inference Yields Open-Vocabulary Semantic Segmentation For-Free," 2024 IEEE/CVF Winter Conference on Applications of Computer Vision (WACV), Waikoloa, HI, USA, 2024, pp. 1392-1402, doi: 10.1109/WACV57701.2024.00143. (Year: 2024).*

(Continued)

*Primary Examiner* — Michelle M Koeth

(74) *Attorney, Agent, or Firm* — Quinn IP Law

(57) ABSTRACT

A multi-objective dense open-vocabulary system includes an image encoder and a classifier. The image encoder includes a summarization contrastive language image pre-training (CLIP) head trained on supervised losses from unlabeled and labeled image data. The summarization CLIP head loses open-vocabulary capabilities as capacity grows, and offsets the loss with pseudo-labels generated by a dense CLIP head. The summarization CLIP head is operational to receive captured images from a source device, and generate image embeddings based on current images. The classifier is operational to receive one or more targets from a text encoder, receive the plurality of image embeddings from the summarization CLIP, classify the plurality of image embeddings to identify one or more output images that contain the one or more targets, and present the one or more output images to the destination device.

20 Claims, 7 Drawing Sheets

(56) References Cited

U.S. PATENT DOCUMENTS

| | | | | |
|---|---|---|---|---|
| 2024/0203085 | A1* | 6/2024 | Bangalath | G06T 1/0021 |
| 2024/0378859 | A1* | 11/2024 | He | G06V 10/774 |

OTHER PUBLICATIONS

Ghiasi et al., "Scaling Open-Vocabulary Image Segmentation with Image-Level Labels," arXiv:2112.12143v2 [cs.CV] Jul. 20, 2022 (Year: 2022).*

Levi et al., "Object-Centric Open-Vocabulary Image Retrieval with Aggregated Features," arXiv:2309.14999v1 [cs.CV] Sep. 26, 2023 (Year: 2023).*

* cited by examiner

MULTI-OBJECTIVE DENSE OPEN-VOCABULARY IMAGE RECORDING

INTRODUCTION

The present disclosure relates to a system and a method for multi-objective dense open-vocabulary image recording.

Existing fixed pre-trained open-vocabulary techniques provide reduced results on target datasets on which the technique is untrained. The fixed pre-trained open-vocabulary techniques also use two stages embedding processes that tend to be slow and complex. Existing supervised open-vocabulary techniques have improved results over the fixed pre-trained open-vocabulary techniques in annotated categories and may have a single-stage embedding process. However, the supervised open-vocabulary techniques tend to diverge from the original training for new categories as the learned capacity grows.

Accordingly, those skilled in the art continue with research and development efforts in the field of dense open-vocabulary systems and methods for image recording.

SUMMARY

A multi-objective dense open-vocabulary system is provided herein. The system includes an image encoder and a classifier. The image encoder has a summarization contrastive language image pre-training (CLIP) head, and is couplable to a source device. The summarization CLIP head is trained on supervised losses from unlabeled image data and labeled image data. The summarization CLIP head loses open-vocabulary capabilities as capacity grows. The summarization CLIP head is trained on pseudo-label losses from a plurality of pseudo-labels that offsets the loss of the open-vocabulary capabilities. The plurality of pseudo-labels is generated from a plurality of text embeddings based on similarities to a plurality of average semantics created by a dense CLIP head. The summarization CLIP head is operational to receive a plurality of captured images from the source device, and generate a plurality of image embeddings based on the plurality of captured images. The classifier is coupled to the image encoder, couplable to a text encoder, and couplable to a destination device. The classifier is operational to receive one or more targets from the text encoder, receive the plurality of image embeddings from the summarization CLIP, classify the plurality of image embeddings to identify one or more output images that contain the one or more targets, and present the one or more output images to the destination device.

In one or more embodiments of the system, the summarization CLIP head includes a backbone operational to extract a plurality of finetuned features from the unlabeled image data and the labeled image data.

In one or more embodiments of the system, the summarization CLIP head further includes a detection transformer decoder layer operational to predict a plurality of objects based on the plurality of finetuned features and a plurality of learnable queries.

In one or more embodiments of the system, the summarization CLIP head further includes a multi-head attention layer operational to generate the plurality of image embeddings in response to the plurality of finetuned features and the plurality of objects.

In one or more embodiments of the system, the dense CLIP head includes a backbone operational to extract a plurality of fixed features from the unlabeled image data and the labeled image data.

In one or more embodiments of the system, the dense CLIP head further includes a clustering module operational to cluster the plurality of fixed features to create the plurality of average semantics.

In one or more embodiments of the system, the dense CLIP head further includes an embedding system operational to generate the plurality of pseudo-labels from the plurality of text embeddings based on the plurality of average semantics.

In one or more embodiments of the system, the source device is a camera operational to generate the plurality of captured images.

In one or more embodiments of the system, the destination device is a memory operational to record the one or more output images.

In one or more embodiments of the system, the destination device is a display device operational to optically display the one or more output images.

A method for multi-objective dense open-vocabulary image recording provided herein. The method includes receiving a plurality of captured images at an image encoder from a source device. The image encoder has a summarization contrastive language image pre-training (CLIP) head. The summarization CLIP head is trained on a supervised loss from unlabeled image data and labeled image data. The summarization CLIP head loses open-vocabulary capabilities as capacity grows. The summarization CLIP head is trained on a pseudo-label loss from a plurality of pseudo-labels that offsets the loss of the open-vocabulary capabilities. The plurality of pseudo-labels is generated from a plurality of text embeddings based on similarities to a plurality of average semantics created by a dense CLIP head. The method includes generating a plurality of image embeddings with the summarization CLIP head based on the plurality of captured images, receiving one or more targets from a text encoder at a classifier, receiving the plurality of image embeddings from the summarization CLIP head at the classifier, classifying the plurality of image embeddings to identify one or more output images that contain the one or more targets, and presenting the one or more output images to a destination device.

In one or more embodiments, the method includes extracting a plurality of finetuned features from the unlabeled image data and the labeled image data with summarization CLIP head.

In one or more embodiments, the method includes predicting a plurality of objects based on the plurality of finetuned features and a plurality of learnable queries with the summarization CLIP head.

In one or more embodiments, the method includes generating the plurality of image embeddings in response to the plurality of finetuned features and the plurality of objects with the summarization CLIP head.

In one or more embodiments, the method includes extracting a plurality of fixed features from the unlabeled image data and the labeled image data with the dense CLIP head.

In one or more embodiments, the method includes clustering the plurality of fixed features to create the plurality of average semantics with the dense CLIP head.

In one or more embodiments, the method includes generating the plurality of pseudo-labels from the plurality of text embeddings based on the plurality of average semantics with the dense CLIP head.

In one or more embodiments, the method includes generating the plurality of captured images with a camera.

In one or more embodiments, the method includes recording the one or more output images, and displaying optically the one or more output images.

A vehicle is provided herein. The vehicle includes a camera, a contrastive language image pre-training (CLIP) text encoder, a destination device, and a multi-objective dense open-vocabulary system. The camera is operational to generate a plurality of captured images. The CLIP text encoder is operational to generate one or more targets. The destination device is operational to one or more of (i) record one or more output images and (ii) optically display the one or more output images. The multi-objective dense open-vocabulary system has an image encoder and a classifier. The image encoder has a summarization CLIP head, and is coupled to the camera. The summarization CLIP head is trained on a supervised loss from unlabeled image data and labeled image data. The summarization CLIP head loses open-vocabulary capabilities as capacity grows. The summarization CLIP head is trained on a pseudo-label loss from a plurality of pseudo-labels that offsets the loss of the open-vocabulary capabilities. The plurality of pseudo-labels is generated from a plurality of text embeddings based on similarities to a plurality of average semantics created by a dense CLIP head. The dense CLIP head is operational to receive the plurality of captured images from the camera, and generate a plurality of image embeddings based on the plurality of captured images. The classifier is coupled to the image encoder, coupled to the CLIP text encoder, and coupled to the destination device. The classifier is operational to receive the one or more targets from the CLIP text encoder, receive the plurality of image embeddings from the summarization CLIP head, classify the plurality of image embeddings to identify the one or more output images that contain the one or more targets, and present the one or more output images to the destination device.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure provide a system/and or method for multi-objective dense open-vocabulary image recording. Dense open-vocabulary image retrieval (D-OVIR) systems are commonly used with large number of applications, allowing textual querying in a dense manner. In various embodiments, the system/method include both a fixed pre-trained technique and a supervised finetuned technique. The fixed pre-trained technique utilizes a pre-trained open-vocabulary head that keeps an original vision-language association among images and text. The supervised finetuned technique is directly optimized for retrieval on target dataset categories, but tends to forget the open-vocabulary capabilities as capacity grows. Therefore, the finetuning scheme of the supervised method is augmented with auxiliary targets from the fixed scheme, allowing learning without open-vocabulary forgetting that may be further improved with the leverage of unlabeled data. The combination of both schemes achieves increased retrieval results on a target dataset on both trained and zero-shot categories.

Figure 1:
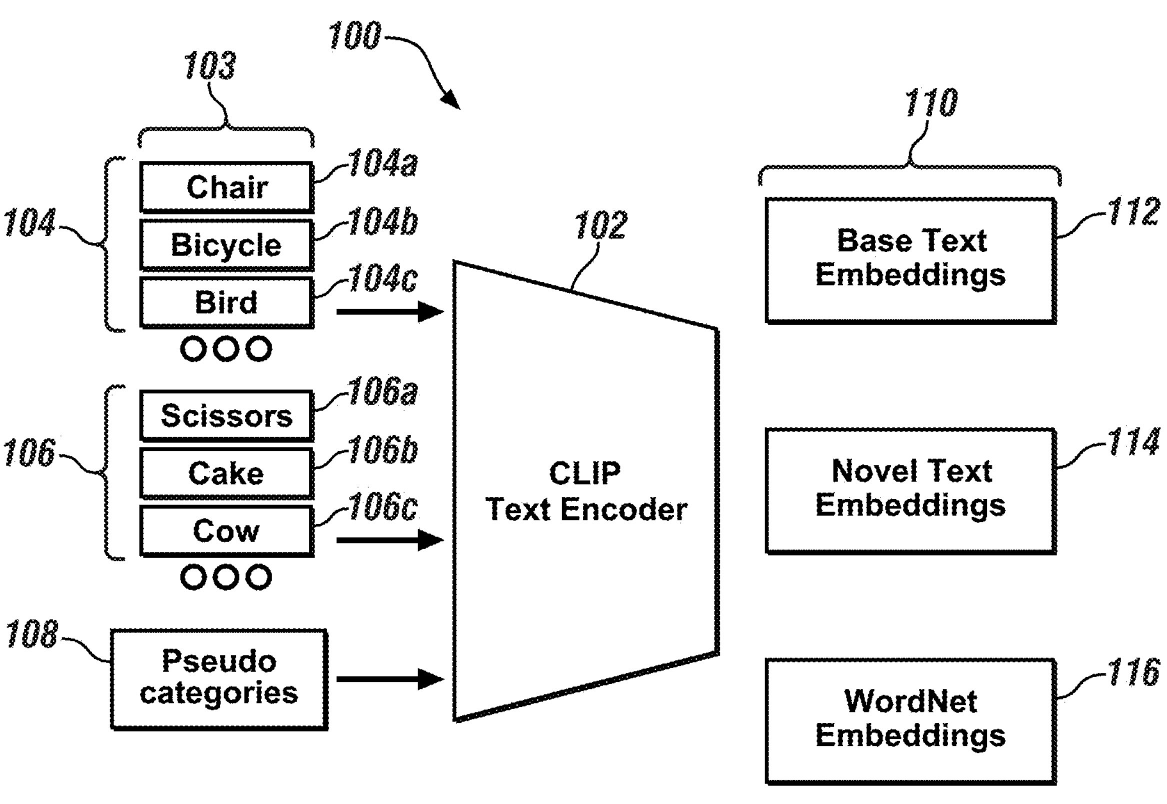
FIG. 1 is a schematic diagram of text processing in accordance with one or more exemplary embodiments.

Referring to FIG. 1, a schematic diagram of an example implementation of text processing is shown in accordance with one or more exemplary embodiments. The text processing 100 generally includes a text encoder 102. In various embodiments, the text encoder may implement a contrastive language-image pre-training (CLIP) text encoder 102. The CLIP text encoder 102 is operational to generate embeddings for text words and/or strings in various category lists 103. The category lists 103 may include a base-categories list 104, a novel-categories list 106, and a pseudo-categories list 108. The base-categories list 104 includes basic items such as a chair 104*a*, a bird 104*b*, a bicycle 104*c*, and so on. The novel-categories list 106 generally include other items such as scissors 106*a*, a cake 106*b*, a cow 106*c*, and so on. The CLIP text encoder 102 generates and presents the embeddings in corresponding groups of targets embeddings 110. The target embeddings 110 may include base text encodings 112, novel text encodings 114, and pseudo-encodings 116. The base text encodings 112 include embeddings for training, ground truth validation, and base scores. The novel text encodings 114 may include embeddings for validation and novel scores. The pseudo-encodings 116 may include embeddings for training and pseudo-labels.

Figure 2:
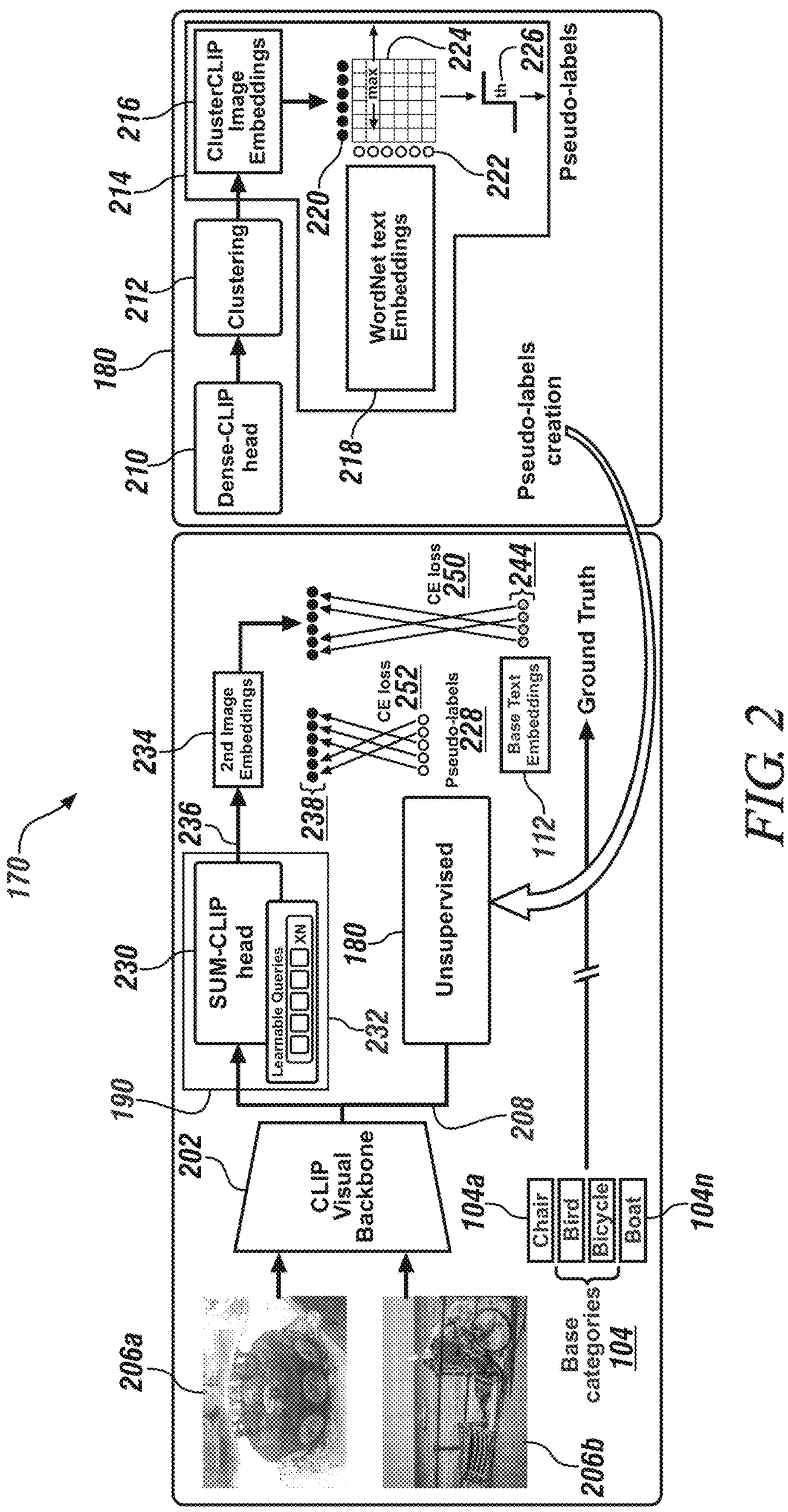
FIG. 2 is a schematic diagram of a training framework of the system in accordance with one or more exemplary embodiments.

Referring to FIG. 2, with reference back to FIG. 1, a schematic diagram of an example training framework of a system is shown in accordance with one or more exemplary embodiments. The training framework 170 generally includes a unsupervised open-vocabulary system 180, a supervised open-vocabulary system 190, a CLIP visual backbone 202, and category lists (e.g., the base category lists 104). The CLIP visual backbone 202 may receive images as unlabeled image data 206*a* and labeled image data 206*b*.

The unsupervised open-vocabulary system 180 implements a pre-trained open-vocabulary model system. In some embodiments, the unsupervised open-vocabulary system 180 includes a dense CLIP head 210, a clustering module 212, and an embedding system 214. The embedding system 214 generally includes first image embeddings 216, a first text embeddings 218, and an embedding space 224.

The supervised open-vocabulary system 190 implements a finetuned open-vocabulary model system. In various embodiments, the supervised open-vocabulary system 190 includes a summarization (SUM)-CLIP head 230. The supervised open-vocabulary system 190 is operational to train the SUM-CLIP head 230 based on the unlabeled image data 206*a*, the labeled image data 206*b*, and the pseudo-labels 228 received from the unsupervised open-vocabulary system 180. The tuning generally aids to offset the losses of the open-vocabulary capabilities as a capacity of the model grows.

The training framework 170 is built upon a pre-trained dual-encoder vision-language model with distinct processing pipelines for vision and text. Text processing progresses by applying the pre-trained CLIP text encoder 102 (FIG. 1) on the three lists of texts: the base-categories list 104, the novel-categories list 106 (both induced from a target dataset annotation space) and the pseudo-categories list 108.

Embodiments of the disclosure aim to retrieve images containing objects from the novel-categories list 106 beyond the base-categories list 104 on which an image-encoding model is trained. Formally, given a target dataset, the image-encoding model is trained on a training evaluation split with both the base-categories list 104 (CB) and the novel-categories list 106 (CN) unseen through training (e.g., intersection of the lists CB n CN=Ø). The training framework 170 is built upon a pre-trained dual-encoder vision-language model with distinct processing pipelines for vision and text. Text processing (illustrated in FIG. 1) progresses by applying the pre-trained CLIP text encoder 102 on the three categories lists 103 (e.g., 104, 106, and 108) of text. Visual processing includes a frozen CLIP residual neural network (ResNet) backbone 202, followed by two heads: (i) the dense CLIP head 210 in the unsupervised open-vocabulary system 180, and (ii) the SUM-CLIP head 230 in the supervised open-vocabulary system 190, arranged in parallel streams.

Training follows a semi-supervised paradigm where the trainable SUM-CLIP head 230 is instructed both by a supervised loss 252 and by outputs of the dense CLIP head 210 through a pseudo-labels loss. Given an input image with adjacent base-categories annotations, processing progresses by an initial execution through the CLIP visual backbone 202. Generated intermediate feature-maps are subsequently executed by dense CLIP head 210, which generates pseudo-labels 228, and by the SUM-CLIP head 230, which summarizes image content and generates multiple (e.g., N) second image embeddings 234. The second image embedding 234 are supervised at training by comparison against two sets of the language embeddings (e.g., CB and CP) using set prediction losses. Positives may be defined by images labels (supervised loss) and by the pseudo-labels 228 (unsupervised loss), generated by the dense CLIP branch. Notably, results may further be improved by leveraging unlabeled data from the target dataset and using unsupervised loss only. Experiments show that effective results may be achieved even when only a small portion of the data is labeled.

During inference, a vision encoder comprising the CLIP visual backbone 202 and the fine-tuned SUM-CLIP head 230, is applied to each image in the dataset, generating a set of embeddings per image. Evaluation is done by ranking the cosine similarity between the text embedding of each category in a union CB∪CN and the second image embeddings 234 generated by the SUM-CLIP head 230.

In a CLIP head, the CLIP last layer is implemented as a pooling multi-head attention layer, where the query is pooled from the input tensor itself by averaging. The CLIP head sums information from all the pixels in the input tensor weighted by the similarity to the query vector and projects an output linear layer. The CLIP attention layer generates a single global embedding per image.

The SUM-CLIP head 230 aims to represent the "average" semantics in images using a single query. The SUM-CLIP head 230 captures multiple objects by employing additional learnable queries and decoder layers preceding the CLIP head.

The dense CLIP head 210 focuses on local semantics induced by CLIP original weights. The dense CLIP head 210 aims to utilize local semantics, already captured by the spatial locations at the input to the attention layer.

The CLIP visual backbone 202 is operational to encode a visual dataset. The CLIP visual backbone 202 may be referred to as a first visual backbone. The visual dataset generally includes the unlabeled image data 206*a* and the labeled image data 206*b*. The resulting encoded data 208 is presented to the unsupervised open-vocabulary system 180 and the supervised open-vocabulary system 190.

The dense CLIP head 210 generates fixed pre-trained open-vocabulary model embeddings from the encoded data 208 created by the CLIP visual backbone 202. The embeddings provide the pseudo-labels 228 used to train the trainable portion of the supervised open-vocabulary system 190.

The clustering module 212 generally implements a fixed clustering module. The clustering module 212 is operational to group similar image vector-text vector pairings among multiple clusters.

The first image embeddings 216 may implement cluster CLIP image embeddings. The image embeddings generally provides numerical representations of images that capture semantic meaning and visual features as numerical vectors. The first image embeddings 216 provide first image vector representations 220 of the associated unlabeled image data 206*a* and labeled image data 206*b* as processed by the dense CLIP head 210.

The first text embeddings 218 may implement WordNet text embeddings. WordNet is a database of English words developed by Princeton University (Princeton, New Jersey). Text embeddings are generally neuro-linguistic (NLP) techniques that convert textual data into numerical vectors. The first text embeddings 218 provides text vector representations 222 of associated text strings.

Pairs of the image vector representations 220 and the text vector representations 222 populate the embedding space 224. After contrastive pre-training, diagonal pairs generally have high cosine similarities while non-diagonal pairs have lower cosine similarities. Pairs having similarities above a threshold value 226 are selected as the pseudo-labels 228 and presented to the supervised open-vocabulary system 190.

In addition to the SUM-CLIP head 230, the supervised open-vocabulary system 190 may also include a list of learnable queries 232. The summarization head 230 generally received the encoded data 208 from the CLIP visual backbone 202 and generates the second image embeddings 234.

The SUM-CLIP head 230 is generally operational to generate dense video captions and construct summaries 236 by selecting key frames from the video based on the encoded data 208 and the learnable queries 232.

The learnable queries 232 implements a set of multiple (e.g., N) queries used to train the supervised open-vocabulary system 190.

The second image embeddings 234 generally provide second image vector representations 238 for the dense video captions and construct summaries 236 as processed by the SUM-CLIP head 230.

The base categories 104 implement the sets of text strings 104*a*-104*n*. The text strings 104*a*-104*n* are used by the CLIP text encoder 102 (FIG. 1) to create grounded truth text embeddings 244.

The grounded truth text embeddings 244 may be paired with matching generate second image vector representations 238. First cross-entropy losses 250 are established is a metric used in the training to measure how well the resulting classification model performs. As the open-vocabulary capacity of the grounded truth text embeddings 244 grows, the supervised open-vocabulary system 190 tend to lose open-vocabulary capabilities.

The pseudo-labels 228 may be paired with matching generate second image vector representations 238. Second cross-entropy losses 252 are established is a metric used in the training to measure how well the resulting classification model performs. The supervised open-vocabulary system 190 as trained has a benefit of learning from both the grounded truth text embeddings 244 and the pseudo-labels 228 and so may avoid losing some to most of the open-vocabulary capabilities.

Figure 3:
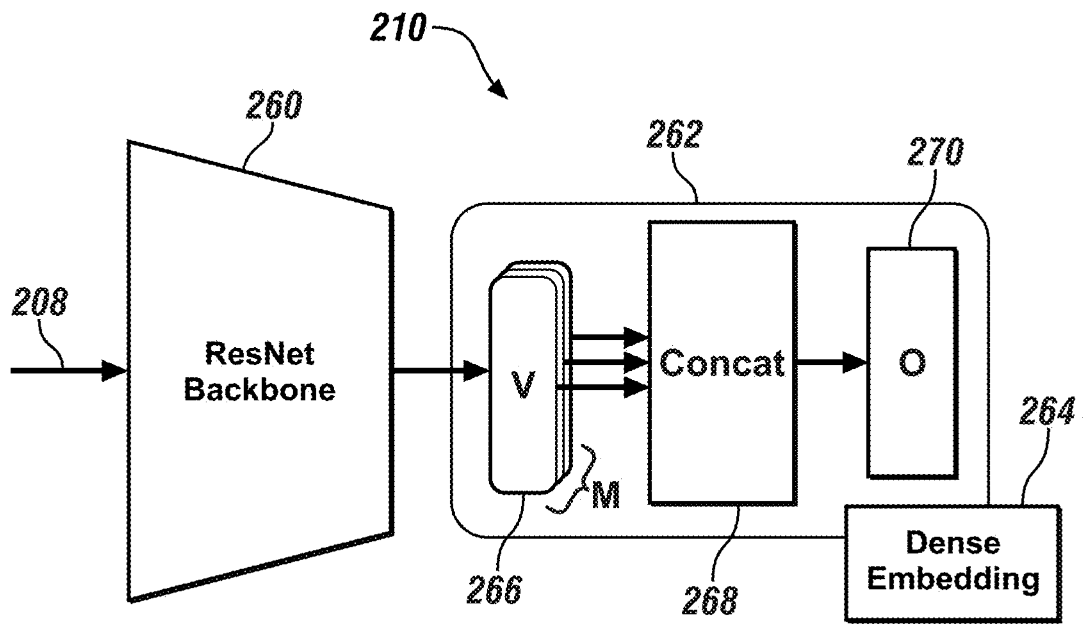
FIG. 3 is a schematic diagram of a dense-contrastive language-image pre-training (CLIP) head in accordance with one or more exemplary embodiments.

Referring to FIG. 3, a schematic diagram of an example implementation of the dense CLIP head 210 is shown in accordance with one or more exemplary embodiments. The dense CLIP head 210 generally incudes a second backbone 260 and a first head network 262. The second backbone 260 may receive the encoded data 208. The first head network 262 produces first image embeddings 264.

The dense CLIP head 210 utilizes local semantics already captured by the spatial locations at the input to the attention layer. The formulation is formalized as follows $y_i=c(z_i)$, where $z_i=v(x_i)$. The output embedding $Y\in R^{K\times Co}$ is a tensor, $y_i$ is the representation of an i'th spatial pixel $$Y=\{y_i\}\frac{K}{i=1},\ y_i\in R^{1\times Co}$$

and K is determined by the input image size and the model stride (e.g., K=196 for image size of 448×448 and stride=32). The formulation, implemented by removing the query and key linear layers and substituting the value and output linear layers with 1×1 convolutional layers (initialized with CLIP weights), essentially produces dense patch embeddings aligned with a CLIP output space.

The second backbone 260 may implement a ResNet backbone. The second backbone 260 is operational to extract fixed features from the input images to create feature maps at various resolution levels. The feature maps at the lower resolution levels contain accurate spatial information. The feature maps at the higher resolution level have finer semantic information due to a large receptive field.

The first head network 262 is operational to fuse the features from all levels to enhance features with both higher accuracy and more semantic meaning. Based on the enhanced features, the first head network 262 is further operational to provide object detection, classifying the object classes, and regressing the object bounding boxes. A linear layer 266 (e.g., V) and a first concatenation layer 268 may fed into an output layer 270. The first image embeddings 264 are presented from the output layer 270 of the dense CLIP head 210.

Figure 4:
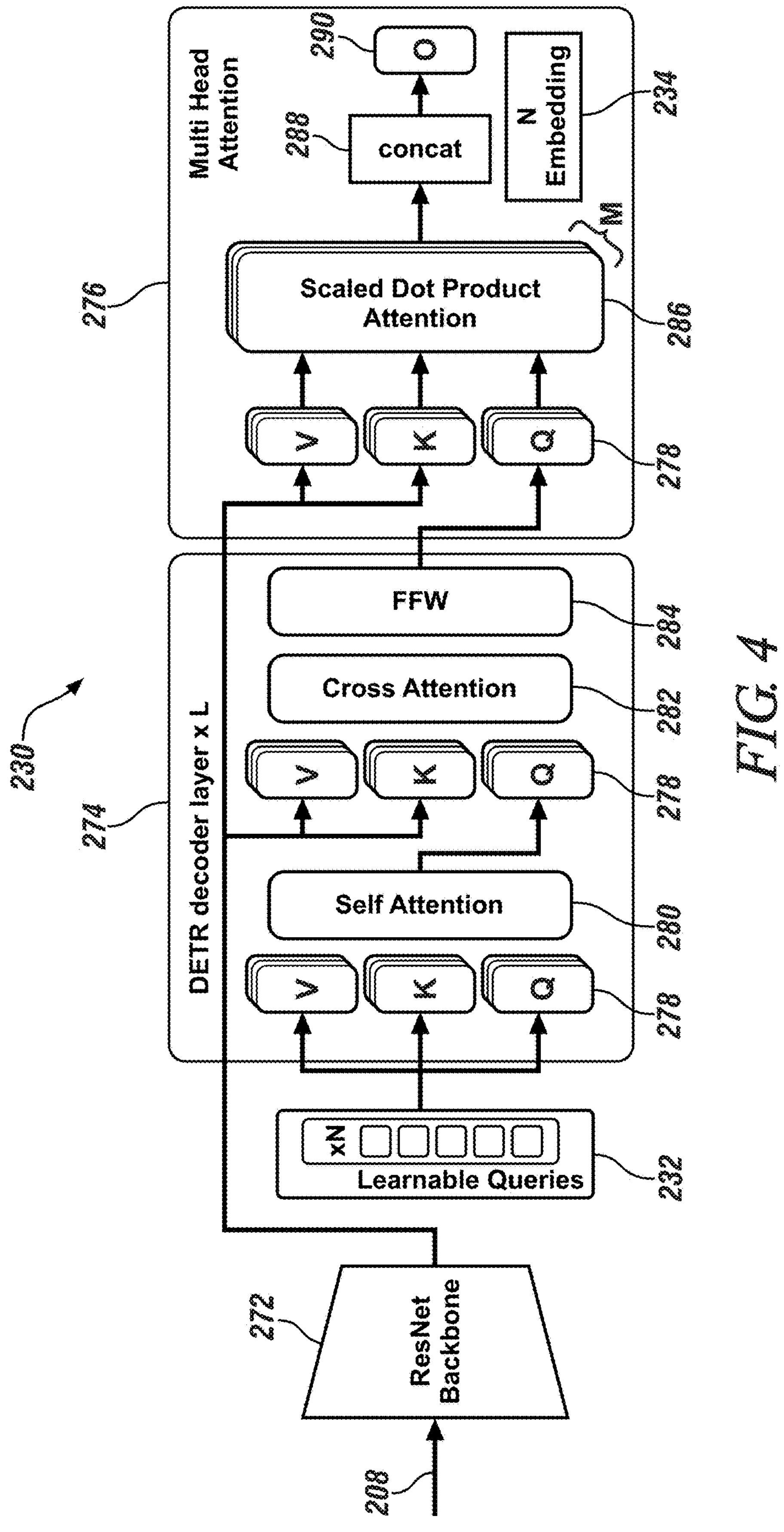
FIG. 4 is a schematic diagram of a summarization-CLIP head in accordance with one or more exemplary embodiments.

Referring to FIG. 4, a schematic diagram of an example implantation of the SUM-CLIP head 230 is shown in accordance with one or more exemplary embodiments. The SUM-CLIP head 230 generally includes a third backbone 272 a decoder layer 274 and a multi-head attention layer 276. The third backbone 272 may receive the encoded data 208. The decoder layer 274 may receive the learnable queries 232. The multi-head attention layer 276 produces the second image embeddings 234.

The SUM-CLIP head 230 SUM-CLIP is implemented as a multi-head attention layer. Linear layers 278 (e.g., q, k, and v) of the SUM-CLIP head 230 are initialized with CLIP weights and the learnable queries 232, pre-defined in number, are trainable as follows: $y_i=c(z)$, and $z_i=\text{softmax}(q(Q)\cdot k(X)^T)(X)$. Compared to the CLIP, which targets the representation of "average" semantics in images using x as a single query, SUM-CLIP is designed to capture multiple objects by setting additional learnable embeddings $Q\in R^{N\times Ci}$ as queries. The output embedding $Y\in R^{N\times Co}$ is a tensor, and $y_i$ is the representation of the i'th spatial pixel:

$$Y=\{y_i\in R^{1\times Co}\}\frac{N}{i=1}.$$

In various embodiments, the architecture is a decoder variant of a CLIP attention layer with the learnable queries 232, and as such may be extended by additional (e.g., L) decoder layers 274. With the additional learnable queries 232, two goals are generally met: first, the output dimension is limited to a small number of representatives, suitable for large scale retrieval frameworks with no extensive post-processing. Second, as the linear layers may be initialized with CLIP weights, training is allowed while biasing towards CLIP original vision-language association.

The third backbone 272 implements another ResNet visual backbone. The third backbone 272 is operational to extract finetuned features from the input images to create feature maps at various resolution levels. The feature maps at the lower resolution levels contain accurate spatial information. The feature maps at the higher resolution level have finer semantic information due to a large receptive field.

The decoder layer 274 implements one or more (e.g., L) detection transformer (DETR) decoder layers. The decoder layer 274 is operational to perform a set-based object detector using a transformer on top of a convolutional backbone. The decoder layer 274 includes a self-attention layer 280, a cross attention layer 282 and a feed forward (FFW) layer 284.

The multi-head attention layer 276 is operational to perform an attention mechanism several times in parallel. The parallel attention outputs are subsequently concatenated and linearly transformed into an expected dimension. The multi-head attention layer 276 includes the linear layers 278 (e.g., q, k, and v), a scaled dot product attention layer 286, a second concatenation layer 288 and an output layer 290. The output layer 290 presents the second image embedding 234.

Figure 5:
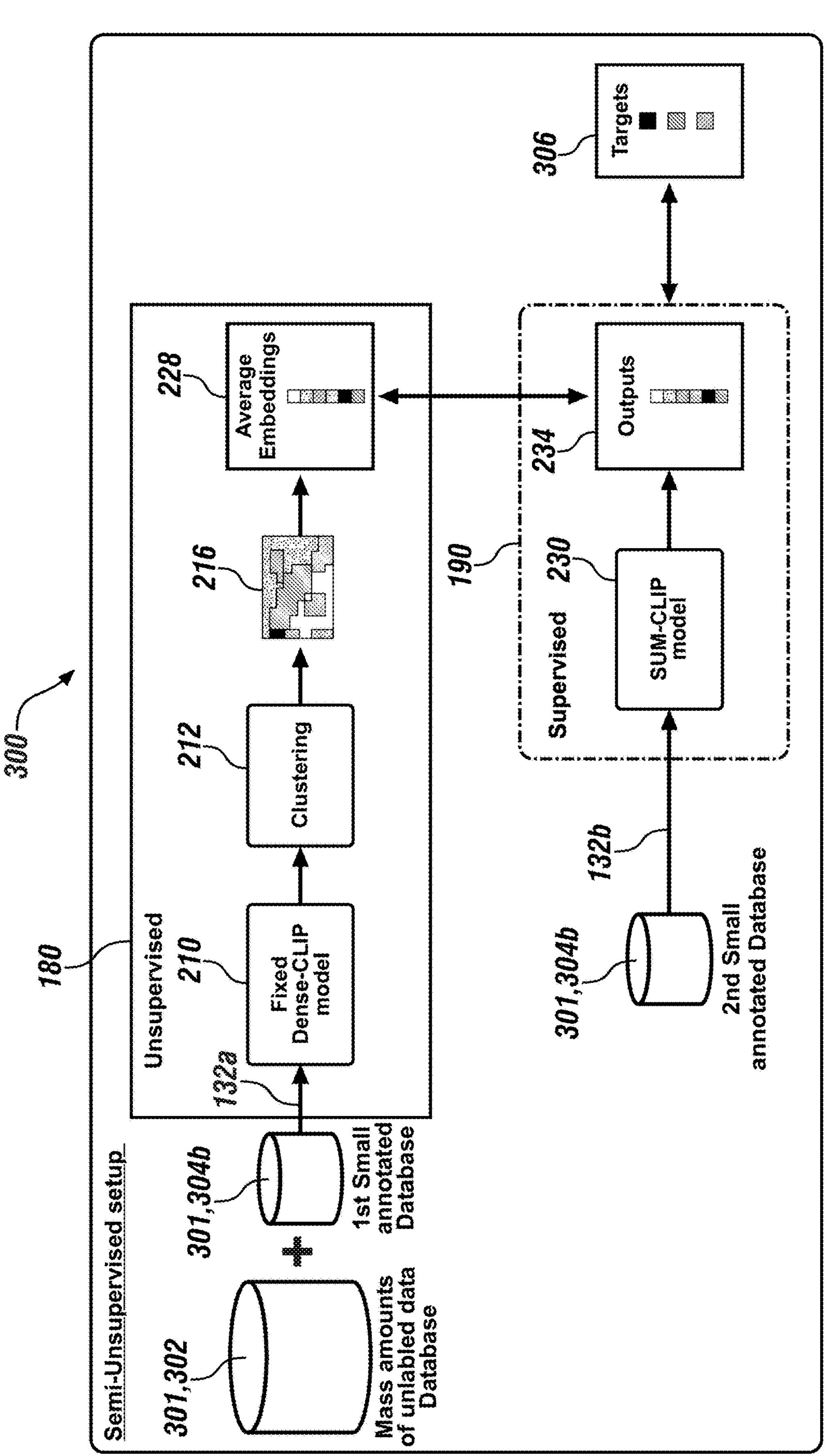
FIG. 5 is a schematic diagram of a semi-supervised setup in accordance with one or more exemplary embodiments.

Referring to FIG. 5, a schematic diagram of an example implementation of a semi-supervised setup 300 is shown in accordance with one or more exemplary embodiments. The semi-supervised setup 300 generally includes the unsupervised open-vocabulary system 180, the supervised open-vocabulary system 190, and the image data 301. The image data 301 includes a large unlabeled dataset 302, a first smaller annotated dataset 304*a*, and a second smaller annotated dataset 304*b*. In various embodiments, the first smaller annotated dataset 304*a* may be the same as the second smaller annotated dataset 304*b*. In other embodiments, the first smaller annotated dataset 304*a* may be different than the second smaller annotated dataset 304*b*.

As shown in FIG. 2, the unsupervised open-vocabulary system 180 includes the dense CLIP model 210, the clustering module 212 that generates the first image embeddings 216 that form the pseudo-labels 228. The supervised open-vocabulary system 190 includes the SUM-CLIP head 230 that generates the second image embeddings 234.

The large unlabeled dataset 302 and the first smaller annotated dataset 304*a* provide first image data 132*a* to train the unsupervised open-vocabulary system 180. The second smaller annotated dataset 304*b* provides second image data 132*b* to train the supervised open-vocabulary system 190. The unsupervised open-vocabulary system 180 further provides the pseudo-labels 228 to further train the supervised open-vocabulary system 190 to account for forgotten pairings.

The setup 300 generally utilizes an output (e.g., the pseudo-labels 228) of the unsupervised open-vocabulary system 180 as auxiliary targets for training the supervised open-vocabulary system 190. The loss terms recovered by the pseudo-labels 228 assists in training for targets 306 in the unlabeled dataset 302, so the supervised open-vocabulary system 190 is trained by more than the annotated images in the first smaller annotated dataset 304*a* and/or the second smaller annotated dataset 304*b*. Unlabeled data, usually found in greater numbers, may be also used to further improve accuracy in the semi-supervised setup 300.

Figures 6, 7:
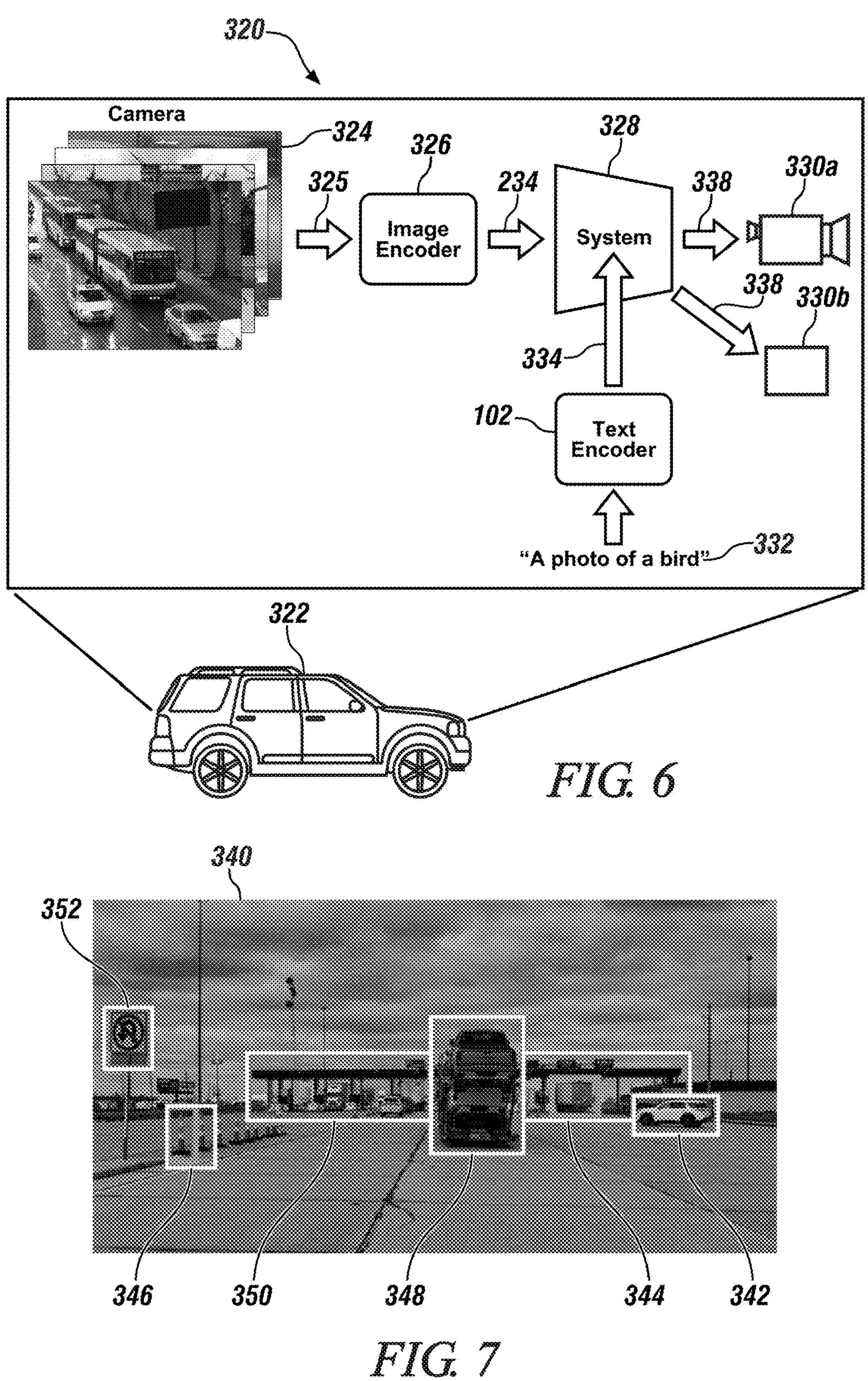
FIG. 6 is a schematic diagram of an online triggered recording system in accordance with one or more exemplary embodiments.
FIG. 7 is a picture of an output image with recognized targets in accordance with one or more exemplary embodiments.

Referring to FIG. 6, with reference back to FIG. 2, a schematic diagram of an example implementation of a recording system 320 is shown in accordance with one or more exemplary embodiments. The recording system 320 may be implemented in a vehicle 322. In various embodiments, the vehicle 322 may be an automobile. Other embodiments of vehicle 322 may include a boat, a piece of construction equipment, an airplane, or other devices that may utilize images to record features within an operating environment.

The vehicle 322 may include a text encoder 102, a camera 324, an image encoder 326, a classifier 328, and one or more destination devices 330*a*-330*b*. The destination devices may include a recording device 330*a* and an optional display device 330*b*. Text strings 332 are received by the text encoder 102.

As the vehicle 322 moves in the operating environment, the camera 324 generated captured images 325 of the local environment. A supervised open-vocabulary system 190 (FIG. 2) in the image encoder 326 is operational to encode the captured images 325 to generate the second image embeddings 234. The second image embeddings 234 are presented to the classifier 328. A text string 332 of a target (e.g., "A photo of a bird") may be entered into the text encoder 102. The text encoder 102 generates a requested target 334 (e.g., a text embedding) for the text string 332. The target 334 is presented to the classifier 328. The classifier 328 may search the second image embeddings 234 for an object identified by the target 334. Where the search finds the object (e.g., the bird), the classifier 328 may generate an output image 338 that includes the targeted object. The recording destination device 330*a* generally stores the output image 338 for subsequent analysis and/or additional training. Optionally, the output image 338 may be presented on the display device 330*b* to a person riding in the vehicle 322. Although the example described as single requested text string 332, multiple text strings 332 may be requested sequentially.

Referring to FIG. 7, a picture of an example output image 340 with recognized targets is shown in accordance with one or more exemplary embodiments. In the example, "car" 342, "truck" 344 and "cone" 346 may exist as annotated categories in many autonomous vehicle datasets. In contrast, "car carrier trailer" 348, "toll roads" 350, and "No U-Turn sign" 352 may not reside in the autonomous vehicle datasets.

Utilizing both the annotated datasets and the unlabeled datasets in a multi-objective framework provides the benefits of both worlds. The multi-objective framework of the recording system 320, via finetuning, shows increased retrieval accuracy on the target dataset: both on finetuned categories (e.g., bicycles, motorcycles, yield signs) and on zero-shot categories, not annotated in the target dataset.

Figure 8:
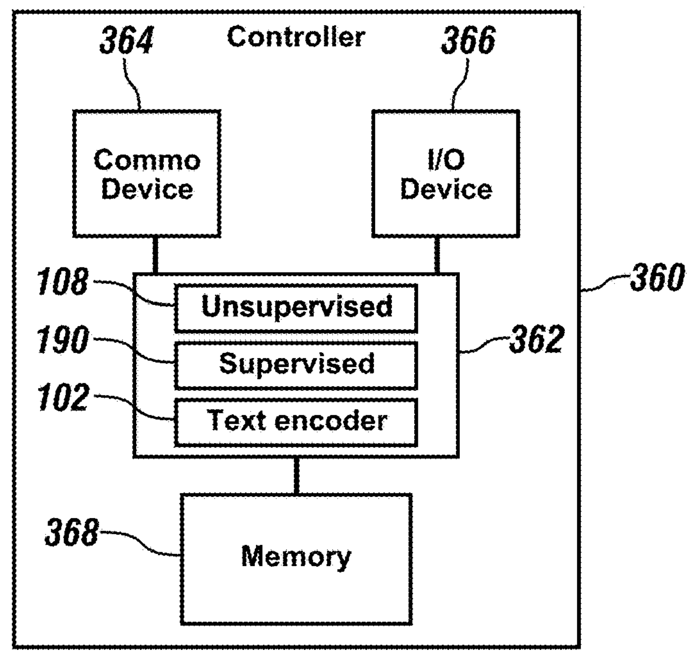
FIG. 8 is a schematic diagram of a controller in accordance with one or more exemplary embodiments.

Referring to FIG. 8, with references back to FIG. 7, a schematic diagram of an example implementation of a controller 360 is shown in accordance with one or more exemplary embodiments. The controller 360 may be mounted in the vehicle 322 and coupled to the camera 324, the recording destination device 330*a*, and the display device 330*b*. The controller 360 includes a computerized processing device 362, a communications device 364, an input/output coordination device 366, and a memory storage device 368. In various embodiments, the controller 360 may include other components and some of the components are not present in some embodiments.

The processing device 362 may include memory (e.g., read only memory (ROM) and random-access memory (RAM)) storing processor-executable instructions and one or more processors that execute the processor-executable instructions. In embodiments where the processing device 362 includes two or more processors, the processors may operate in a parallel or distributed manner. The processing device 362 may execute the operating system of the controller 360. Processing device 362 may include one or more modules executing programmed code or computerized processes or methods including executable steps. Illustrated modules may include a single physical device or functionality spanning multiple physical devices. The processing device 362 may further include programming modules, including the unsupervised open-vocabulary system 180, the supervised open-vocabulary system 190, and the text encoder 102.

The communications device 364 may include a communications/data connection with a bus device configured to transfer data to different components of the vehicle and may include one or more wireless transceivers for performing wireless communication.

The input/output coordination device 366 includes hardware and/or software configured to enable the processing device 362 to receive and/or exchange data with on-board sensors of the vehicle 322, such as the camera 324, the recording destination device 328*a*, and the display 328*b*. The input/output coordination device 366 may also provide control of switches, modules, and processes throughout the vehicle 322 based upon determinations made within processing device 362.

The memory storage device 368 is a device that stores data generated or received by the controller 360. The memory storage device 368 may include, but is not limited to, a hard disc drive, an optical disc drive, and/or a flash memory drive.

The controller 360 is provided as an exemplary computerized device capable of executing programmed code to operate the disclosed process. A number of different embodiments of the controller 360 and modules operable therein are envisioned, and the disclosure is not intended to be limited to examples provided herein.

Figure 9:
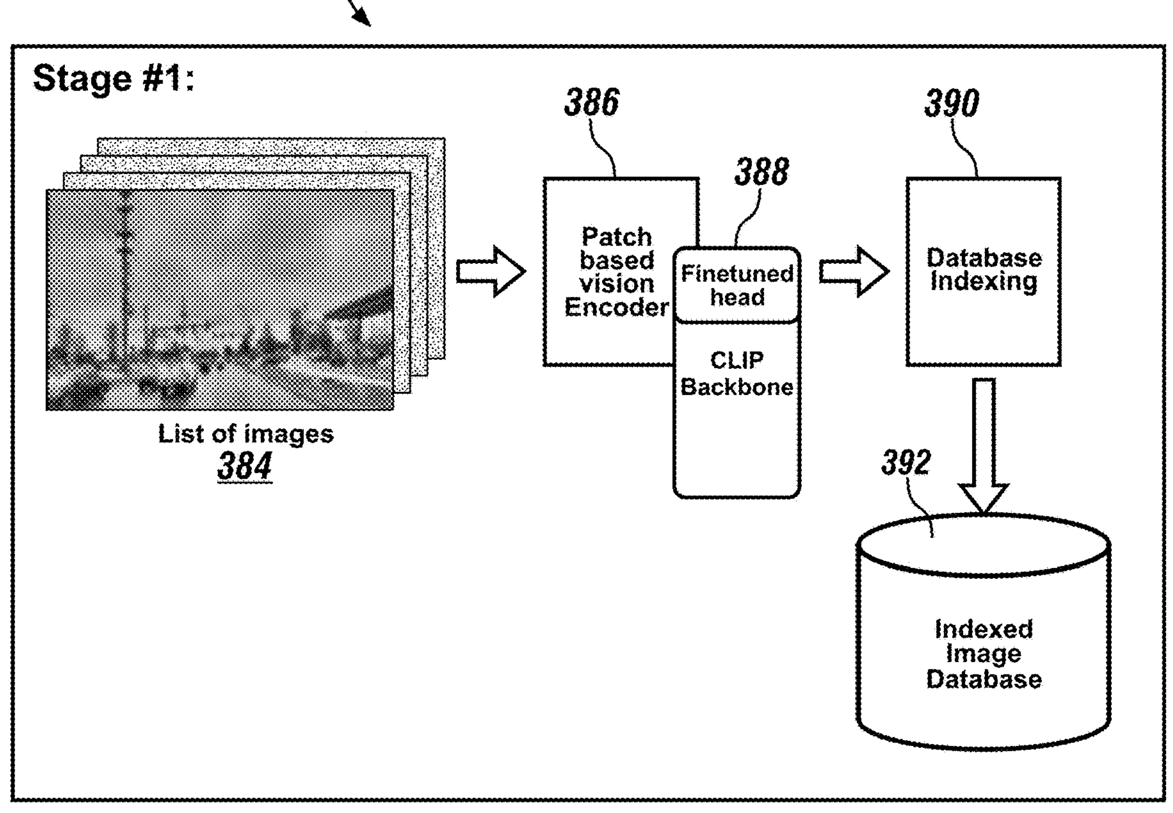
FIG. 9 is a schematic diagram of a first stage of an offline system in accordance with one or more exemplary embodiments.

Referring to FIG. 9, a schematic diagram of an example first stage 382 of an offline system 380 is shown in accordance with one or more exemplary embodiments. The first stage 382 generally includes a list of input images 384, a vision encoder 386, a vision backbone and finetuned head 388, a database indexing module 390, and a database 392. The first stage 382 of the offline system 380 generally searches the list of images 384 for relevant concepts on large datasets and annotate the images for further use.

The first stage 382 is operational to gather and index image embeddings for each image in the database 392. The vision encoder 386 is operational to encode the image data received from the list of images 384.

The backbone and finetuned head 388 may implement a CLIP backbone and a SUM-CLIP head. The backbone and finetuned head 388 are operational to provide image embeddings to the encoded images.

The database indexing module 390 is operational to index the encoded image data with the image embeddings to allow for subsequent quick access and retrieval. The resulting indexed image data is transferred to the database 392.

The database 392 implements one or more storage medium. The database 392 is operational to store the indexed encoded imaged data with the image embeddings.

Figure 10:
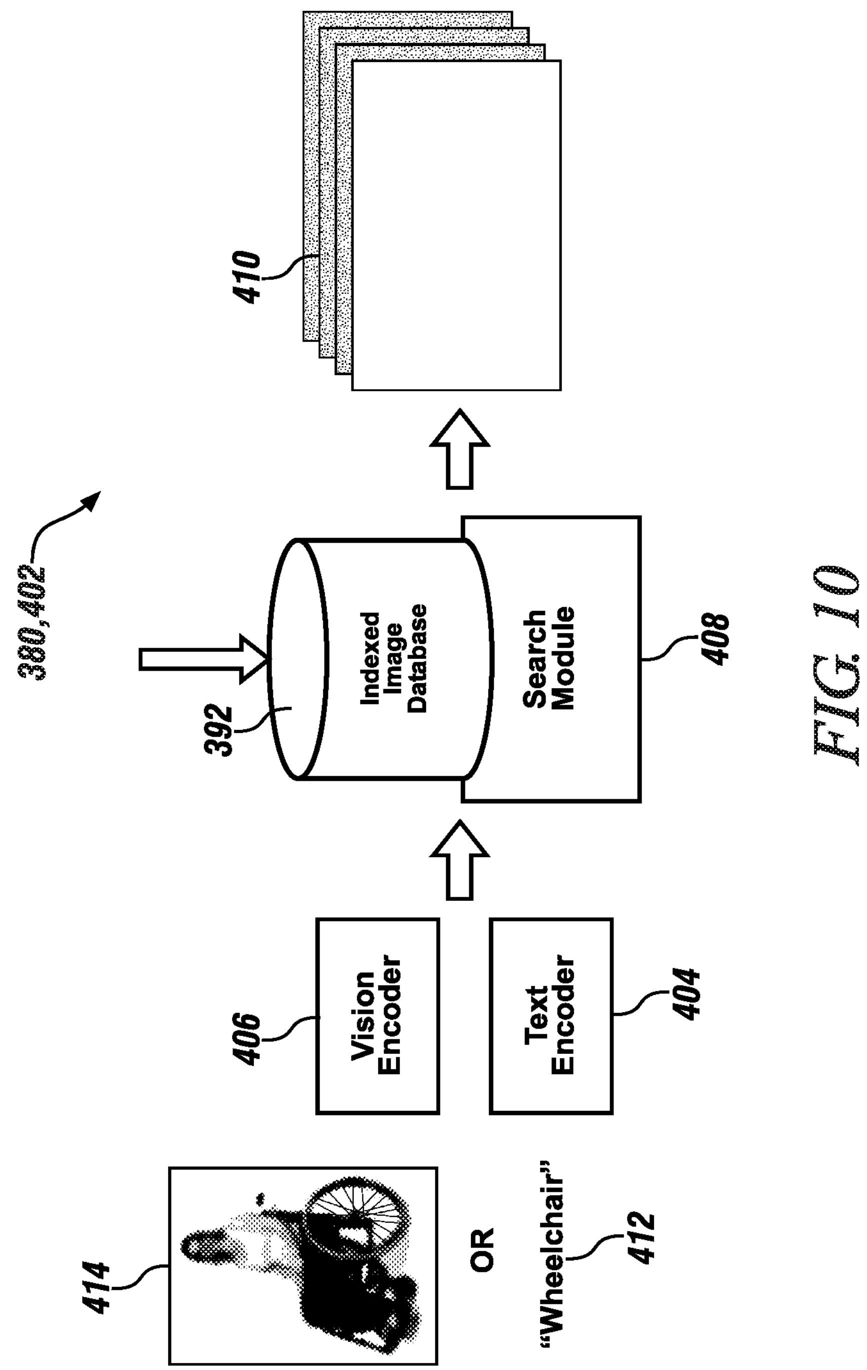
FIG. 10 is a schematic diagram of a second stage of the offline system in accordance with one or more exemplary embodiments.

Referring to FIG. 10, a schematic diagram of an example second stage 402 of the offline system 380 is shown in accordance with one or more exemplary embodiments. The second stage 402 generally includes the database 392 from the first stage 382 (FIG. 9), a text encoder 404, an image encoder 406, and a search module 408. The second stage 402 of the offline system 380 generally searches the database 392 for stored images 410 with corresponding versions of input text strings 412 and/or input images 414.

The text encoder 404 is operational to encode one or more input text strings 412 (e.g., wheelchair"). The resulting target text embeddings are presented to the search module 408.

The image encoder 406 is operational to encode one or more input images 414 The resulting requested target image embeddings are presented to the search module 408.

The search module 408 is operational to search for relevant embeddings in the indexed images stored in the database 392. Up to a predetermined number (e.g., K images) among the matching images 410 with the best correlation to the relevant embeddings may be copied and presented from the database 392 as the offline results.

Various embodiments of the system and/or the method provide a framework that overcome drawbacks of existing supervised finetuned and existing fixed pre-trained techniques. With respect to existing supervised techniques, the framework provides improved results on zero-shot categories (e.g., categories of targets un-seen during training). With respect to the existing fixed techniques, the framework generally allows faster inference time and increased retrieval accuracy on both the trained categories and the novel categories. Furthermore, the multi-objective training aids to mitigate open vocabulary forgetting, and provides for improved through training on unlabeled data.

The framework amalgamates two open vocabulary retrieval approaches, combining and leveraging the respective advantages. Similar to supervised finetuned techniques, the framework is finetuned in a supervised manner on a target dataset, thus compensates potential domain shifts and increases accuracy on the trained categories. Referring to fixed pre-training, the framework utilizes both the pre-trained model backbones (for model transfer) and pre-trained model outputs (as auxiliary targets) for training, ensuring that the pre-trained vision-language association is kept also with untrained categories. Compared to existing fixed pre-trained techniques, the framework finetunes a summarization head, thus simplifies and accelerates the encoding process as no post processing may be performed. The finetuned network is widely applicable and may be incorporated into online applications and/or offline applications.

Embodiments of the disclosure generally provide a multi-objective dense open-vocabulary system that includes an image encoder and a classifier. The image encoder has a summarization contrastive language image pre-training (CLIP) head, and is couplable to a source device. The summarization CLIP head is trained on supervised losses from unlabeled image data and labeled image data, loses open-vocabulary capabilities as capacity grows, and is trained on pseudo-label losses from a plurality of pseudo-labels that offsets the loss of the open-vocabulary capabilities. The plurality of pseudo-labels is generated from a plurality of text embeddings based on similarities to a plurality of average semantics created by a dense CLIP head. The summarization CLIP head is operational to receive a plurality of captured images from a source device, and generate a plurality of image embeddings based on the plurality of captured images.

The classifier is coupled to the image encoder, couplable to a text encoder, and couplable to a destination device. The classifier is operational to receive one or more targets from the text encoder, receive the plurality of image embeddings from the summarization CLIP, classify the plurality of image embeddings to identify one or more output images that contain the one or more targets, and present the one or more output images to the destination device.

Numerical values of parameters (e.g., of quantities or conditions) in this specification, including the appended claims, are to be understood as being modified in each instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of values and further divided ranges within the entire range. Each value within a range and the endpoints of a range are hereby disclosed as a separate embodiment.

While the best modes for carrying out the disclosure have been described in detail, those familiar with the art to which this disclosure relates will recognize various alternative designs and embodiments for practicing the disclosure within the scope of the appended claims.

What is claimed is:

1. A multi-objective dense open-vocabulary system comprising:

an image encoder with a summarization contrastive language image pre-training (CLIP) head, and couplable to a source device, wherein:

the summarization CLIP head is trained on supervised losses from unlabeled image data and labeled image data;

the summarization CLIP head loses pre-trained open-vocabulary capabilities as capacity grows;

the summarization CLIP head is trained on pseudo-label losses from a plurality of pseudo-labels that offsets the loss of the pre-trained open-vocabulary capabilities;

the plurality of pseudo-labels is generated from a plurality of text embeddings based on similarities to a plurality of average semantics created by a dense CLIP head; and the summarization CLIP head is operational to:

receive a plurality of captured images from the source device; and generate a plurality of image embeddings based on the plurality of captured images; and a classifier coupled to the image encoder, coupled to a text encoder, and coupled to a destination device, wherein the classifier is operational to:

receive one or more targets from the text encoder;

receive the plurality of image embeddings from the summarization CLIP;

classify the plurality of image embeddings to identify one or more output images that contain the one or more targets; and present the one or more output images to the destination device.

2. The multi-objective dense open-vocabulary system according to claim 1, wherein the summarization CLIP head includes:

a backbone operational to extract a plurality of finetuned features from the unlabeled image data and the labeled image data.

3. The multi-objective dense open-vocabulary system according to claim 2, wherein the summarization CLIP head further includes:

a detection transformer decoder layer operational to predict a plurality of objects based on the plurality of finetuned features and a plurality of learnable queries.

4. The multi-objective dense open-vocabulary system according to claim 3, wherein the summarization CLIP head further includes:

a multi-head attention layer operational to generate the plurality of image embeddings in response to the plurality of finetuned features and the plurality of objects.

5. The multi-objective dense open-vocabulary system according to claim 1, wherein the dense CLIP head includes:

a backbone operational to extract a plurality of fixed features from the unlabeled image data and the labeled image data.

6. The multi-objective dense open-vocabulary system according to claim 5, wherein the dense CLIP head further includes:

a clustering module operational to cluster the plurality of fixed features to create the plurality of average semantics.

7. The multi-objective dense open-vocabulary system according to claim 6, wherein the dense CLIP head further includes:

an embedding system operational to generate the plurality of pseudo-labels from the plurality of text embeddings based on the plurality of average semantics.

8. The multi-objective dense open-vocabulary system according to claim 1, wherein the source device is a camera operational to generate the plurality of captured images.

9. The multi-objective dense open-vocabulary system according to claim 1, wherein the destination device is a memory operational to record the one or more output images.

10. The multi-objective dense open-vocabulary system according to claim 1, wherein the destination device is a display device operational to optically display the one or more output images.

11. A method for multi-objective dense open-vocabulary image recording comprising:

receiving a plurality of captured images at an image encoder from a source device, wherein:

the image encoder has a summarization contrastive language image pre-training (CLIP) head;

the summarization CLIP head is trained on a supervised loss from unlabeled image data and labeled image data;

the summarization CLIP head loses pre-trained open-vocabulary capabilities as capacity grows;

the summarization CLIP head is trained on a pseudo-label loss from a plurality of pseudo-labels that offsets the loss of the pre-trained open-vocabulary capabilities; and the plurality of pseudo-labels is generated from a plurality of text embeddings based on similarities to a plurality of average semantics created by a dense CLIP head;

generating a plurality of image embeddings with the summarization CLIP head based on the plurality of captured images;

receiving one or more targets from a text encoder at a classifier;

receiving the plurality of image embeddings from the summarization CLIP head at the classifier;

classifying the plurality of image embeddings to identify one or more output images that contain the one or more targets; and presenting the one or more output images to a destination device.

12. The method according to claim 11, further comprising:

extracting a plurality of finetuned features from the unlabeled image data and the labeled image data with summarization CLIP head.

13. The method according to claim 12, further comprising:

predicting a plurality of objects based on the plurality of finetuned features and a plurality of learnable queries with the summarization CLIP head.

14. The method according to claim 13, further comprising:

generating the plurality of image embeddings in response to the plurality of finetuned features and the plurality of objects with the summarization CLIP head.

15. The method according to claim 11, further comprising:

extracting a plurality of fixed features from the unlabeled image data and the labeled image data with the dense CLIP head.

16. The method according to claim 15, further comprising:

clustering the plurality of fixed features to create the plurality of average semantics with the dense CLIP head.

17. The method according to claim 16 further comprising: generating the plurality of pseudo-labels from the plurality of text embeddings based on the plurality of average semantics with the dense CLIP head.

18. The method according to claim 11, further comprising:
generating the plurality of captured images with a camera.

19. The method according to claim 11, further comprising:
recording the one or more output images; and
displaying optically the one or more output images.

20. A vehicle comprising:
a camera operational to generate a plurality of captured images;
a contrastive language image pre-training (CLIP) text encoder operational to generate one or more targets;
a destination device operational to one or more of (i) record one or more output images and (ii) optically display the one or more output images; and
a multi-objective dense open-vocabulary system with an image encoder and a classifier, wherein the image encoder has a summarization CLIP head, and is coupled to the camera, wherein:
the summarization CLIP head is trained on a supervised loss from unlabeled image data and labeled image data;
the summarization CLIP head loses pre-trained open-vocabulary capabilities as capacity grows;
the summarization CLIP head is trained on a pseudo-label loss from a plurality of pseudo-labels that offsets the loss of the pre-trained open-vocabulary capabilities;
the plurality of pseudo-labels is generated from a plurality of text embeddings based on similarities to a plurality of average semantics created by a dense CLIP head;
the dense CLIP head is operational to:
receive the plurality of captured images from the camera; and
generate a plurality of image embeddings based on the plurality of captured images; and
the classifier is coupled to the image encoder, coupled to the CLIP text encoder, and coupled to the destination device, wherein the classifier is operational to:
receive the one or more targets from the CLIP text encoder;
receive the plurality of image embeddings from the summarization CLIP head;
classify the plurality of image embeddings to identify the one or more output images that contain the one or more targets; and
present the one or more output images to the destination device.

* * * * *